2,909,457

NEMATOCIDE CONTROL

Gail H. Birum, Dayton, Ohio, assignor to Monsanto Chemical Company, St. Louis, Mo., a corporation of Delaware No Drawing. Application December 16, 1954
Serial No. 475,839

2 Claims. (Cl. 167—30)

This invention relates to the control of endoparasitic and ectoparasitic worms which exist in the soil at some stage of their life cycles, for example, eggs, larvae and adult worms. The invention is particularly directed to methods of inhibiting and eradicating nematodes or eelworms, e.g., such as the root-node nematode, which attack subterranean plant development.

The control of nematodes and other parasitic worms in soil is a complex problem. These organisms, either in the egg, larvae or adult stage, are protected by a difficultly permeable membrane. Hence, the effective toxicant must have both the property of penetrating the resistant coatings and the ability to kill. It must also be readily dispersible in soils or other environment of the organism and be stable when incorporated therein. Since the object of ridding soils of nematodes and parasites is to provide a beneficial growth media for plants, the nematocide or parasiticide must not be phytotoxic to plants, or, if phytotoxic, this effect must not be long-lived. Such a nematocide, either itself or some phytotoxic decomposition product thereof, should be such that, previous to planting, it is removed from the soil by evaporation, by rain washing or by soil bacterial decomposition.

For the reasons set forth above, completely effective agents for nematodes and other parasitic worm life are not generally available. Furthermore, one skilled in the art cannot predict the effectiveness of compounds as practicable toxicants, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above described requisite properties. A further purpose of this invention is to provide a useful method of freeing soils from objectionable nematode life. Other purposes of this invention will be evident from the following specification.

It has now been found that certain thio-ethers are very effective as nematocides and as agents for controlling other parasitic worms. The presently useful compounds are aromatic sulfides of the following structural formula:

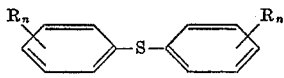

in which R is selected from the class consisting of the chloro and the nitro radicals, and $n$ is an integer of from 1 to 3.

One class of presently useful thio-ethers having the above formula comprises nitro-substituted phenyl sulfides having from 1 to 3 nitro radicals attached to a phenyl ring thereof, i.e., 2-, 3-, or 4-nitrophenyl phenyl sulfide, bis(2-, 3-, or 4-nitrophenyl) sulfide, 2,3-, 2,5-, 2,6-, 3,5- 3,4-, or 2,4-dinitrophenyl phenyl sulfide, 2,3-, 2,5-, 2,6-, 3,5-, 3,4-, or 2,4-dinitrophenyl 2-, 3-, or 4-nitrophenyl sulfide, bis(2,3-, 3,4-, 2,5-, 2,6-, 3,5-, or 2,4-dinitrophenyl sulfide, 2,3,4- or 2,4,5-trinitrophenyl 4-nitrophenyl sulfide, bis(2,4,6-trinitrophenyl) sulfide, etc.

Another class of nematocidal thio-ethers of the above formula includes chloro-substituted phenyl sulfides having from 1 to 3 chlorine atoms attached to a phenyl ring thereof, e.g., 2-, 3-, or 4-chlorophenyl phenyl sulfide, bis(2-, 3-, or 4- chlorophenyl) sulfide, 2,3-dichlorophenyl phenyl sulfide, 3,4-dichlorophenyl 3-chlorophenyl sulfide, bis(2,4- or 2,5-dichlorophenyl) sulfide, 2,4,6-trichlorophenyl 4-chlorophenyl sulfide, bis(2,4,5-trichlorophenyl) sulfide, etc.

Still another class of presently useful sulfides of the above formula comprises phenyl sulfides having both chloro and nitro-substituents, e.g., 2-, 3- or 4-chlorophenyl 2-, 3- or 4-nitrophenyl sulfide, 3,4- or 2,5-dichlorophenyl 2-, 3- or 4-nitrophenyl sulfide, 2,3- or 2,6-dinitrophenyl 2-, 3- or 4-chlorophenyl sulfide, 3,5- or 2,4- dichlorophenyl 3,5- or 2,4-dinitrophenyl sulfide, 2-chloro-4-nitrophenyl phenyl sulfide, 3-chloro-4-nitrophenyl 4-chlorophenyl sulfide, 2-chloro-5-nitrophenyl 3-nitrophenyl sulfide, bis(2-chloro-3-nitrophenyl) sulfide, 4-chloro-2,3-dinitrophenyl 2,4,5-trichlorophenyl sulfide, bis(2,3-dichloro-4-nitrophenyl) sulfide, etc.

The invention is further illustrated, but not limited, by the following examples:

Example 1

Nematocidal evaluation of bis(2,4-dinitrophenyl) sulfide was conducted on an aqueous nematode culture. The compound being examined was introduced into the culture at a concentration of 0.1 percent. It is known that a nematode, when placed in water, flexes its body at a more or less constant rate and that the effect of a nematocide can be estimated reasonably accurately by counting the rate of this flexing action. This motility was observed through a microscope and the number of flexures was counted, the effect of the nematocide being expressed as a percentage of the normal flexing rate of a control dispersion not containing a nematodical agent. The following table sets forth the motility of the nematode as compared to a "control" culture of nematodes which was identical to the test culture except for the bis(2,4-dinitrophenyl) sulfide content:

| Motility after— | Culture containing the test sulfide, percent | Control culture, percent |
| --- | --- | --- |
| 10 minutes | 25 | 100 |
| 20 minutes | 1 | 100 |
| 30 minutes | 1 | 100 |
| 60 minutes | 0 | 100 |
| 2 hours | 0 | 100 |
| 24 hours | 0 | 100 |

Example 2

Testing of the bis(2,4-dinitrophenyl) sulfide in soil was conducted as follows: Five hundred gram portions of uninfected or heat-sterilized soil were placed in respective containers. The soil was then inoculated with the root-node nematode, Meloidogyne spp., by addition of 25 mil. of a suspension prepared by grinding 2 g. of the washed roots of plants infected by the nematode in 100 ml. of water. After inoculating the soil, sufficient water was added to bring the potting soil of each container to approximately 50 percent of field capacity. Twenty-five mls. of a 2.0% emulsion of the bis(2,4-dinitrophenyl) sulfide was then added to one container and 25 mls. of an 0.2% emulsion of said sulfide was added to another container. This treatment gave an 0.1% concentration of the chemical in the soil of one container and an 0.01% concentration of the sulfide in the soil of the other container. The containers were capped, and allowed to stand for one week, at the end of which time two week old Marglobe tomato plants were transplanted to the containers. An untreated, but similarly inoculated, control was also planted. After a growing period of two months, the tomato plants were harvested and the roots washed and examined for evidence of infection. Roots of plants which had been grown in the inoculated soil having either the 0.1% or the 0.01% concentration of the sulfide showed no infection and no evidence of phytotoxic effect, whereas those of the control, i.e., plants grown in the inoculated but untreated soil, were heavily infested.

The present thio-ethers are effective in eliminating or controlling nematode activity when applied to the soil at the rate of 25 to 600 lbs. per acre. Preferred level of application useful in soils of average infestation will be from 50 to 100 lbs. per acre.

Obviously, heavily infested areas may require the use of higher proportions and lightly infested areas may be treated effectively with smaller proportions. The compositions, being water-dispersible, may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adapted for use in the practice of this invention.

In addition to the use in soils, the invention may be practiced in any other nematode environment, for example, green-house potting mixtures and other soil substitutes. Nematode environments may include rooted plants, tubers, seeds and bulbs, in which case the toxicant is used as a rinse to remove and destroy eggs, larvae and adult nematodes which may be present.

The present thio-ethers are useful in destroying endoparasitic worms other than nematodes which frequently infest barnyards or other areas frequented by domestic animals and fowl. The treatment of the surface soils in such localities will minimize infections by flukes, tapeworms and other anthelminics in the animals and fowl by destruction of eggs and larvae of the parasites during the soil phase of their life cycles.

What I claim is:

1. The method of treating nematode-infested soil which comprises dispersing in the soil a toxic quantity of a compound having the structural formula

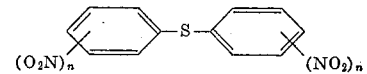

in which $n$ is an integer of from 1 to 2.

2. The method of treating nematode-infested soil which comprises dispersing in the soil a toxic quantity of bis-(2,4-dinitrophenyl) sulfide.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,335,323 | Tisdale | Nov. 30, 1943 |
| 2,377,446 | Payne | June 5, 1945 |
| 2,435,204 | Davidson | Feb. 3, 1948 |
| 2,448,265 | Kagy | Aug. 31, 1948 |
| 2,450,342 | Hester | Sept. 28, 1948 |
| 2,473,984 | Beckerton | June 21, 1949 |
| 2,502,244 | Carter | Mar. 28, 1950 |
| 2,543,580 | Kay | Feb. 27, 1951 |
| 2,572,898 | Woodward | Oct. 30, 1951 |
| 2,651,579 | Plump | Sept. 8, 1953 |
| 2,726,485 | Thomas | Dec. 13, 1955 |
| 2,743,209 | Jones | Apr. 24, 1956 |
| 2,779,680 | Wolf | Jan. 29, 1957 |

FOREIGN PATENTS

| | | |
|---|---|---|
| 124,387 | Australia | June 12, 1947 |
| 452,507 | Italy | Oct. 25, 1949 |

OTHER REFERENCES

Frear: Chem. of Insect., Fung. and Herb. (2nd ed., 1948), pp. 108–122.

Dethier: Chem. Insect Attractants and Repellants, 1947, pp. 252–253.

Feder: Phytopathology, 1954, vol. 44, pp. 428–430.